United States Patent [19]

Heiberg et al.

[11] Patent Number: 5,169,023
[45] Date of Patent: Dec. 8, 1992

[54] TILTING MIXING BOWL

[75] Inventors: Jakob Heiberg, Copenhagen; Stig Lillelund, Gentofte, both of Denmark; Robert H. C. M. Daenen, Erembodegem, Belgium

[73] Assignee: Dart Industries Inc., Deerfield, Ill.

[21] Appl. No.: 754,868

[22] Filed: Sep. 4, 1991

[51] Int. Cl.⁵ .............................................. B65D 8/04
[52] U.S. Cl. ...................................... 220/574; 220/453; 220/468; 220/631; 220/632; 220/671; 220/675; 220/731; 220/732; 220/912; 220/254; 220/306; 220/307; 366/349
[58] Field of Search .............. 220/574, 453, 468, 631, 220/632, 669, 670, 671, 675, 731, 912, 254, 306, 307, 732; 366/129, 349

[56] References Cited

U.S. PATENT DOCUMENTS

| | | | |
|---|---|---|---|
| 1,048,543 | 12/1912 | Kahlenberg | 220/631 X |
| 1,301,694 | 4/1919 | Healy . | |
| 1,394,540 | 10/1921 | Diack | 220/631 X |
| 1,529,072 | 3/1925 | Lennox | 220/671 |
| 1,637,656 | 8/1927 | Radcliffe | 220/254 X |
| 1,989,574 | 1/1935 | Roosendael | 220/631 |
| 2,121,165 | 6/1938 | Slobodkin | 220/631 X |
| 2,793,788 | 5/1957 | Lysne . | |
| 2,802,499 | 8/1957 | Tupper . | |
| 2,873,052 | 2/1959 | Atherton | 220/731 X |
| 3,307,602 | 3/1967 | Boster | 220/306 X |
| 3,468,468 | 9/1969 | Foote | 220/468 X |
| 3,545,645 | 12/1970 | Smith | 220/671 X |
| 3,568,872 | 3/1971 | Logomasini | 220/453 |
| 3,684,633 | 8/1972 | Haase | 220/453 X |
| 3,805,995 | 4/1974 | Lebel et al. . | |
| 3,825,049 | 7/1974 | Swett et al. | 220/631 X |
| 4,289,817 | 9/1981 | Valyi . | |
| 4,403,706 | 9/1983 | Mahajan . | |
| 4,416,197 | 11/1983 | Kehl | 220/254 X |
| 4,480,411 | 11/1984 | Balz et al. | 220/453 X |
| 4,546,900 | 10/1985 | Lackey | 220/453 |
| 4,832,225 | 5/1989 | Benjamin | 220/254 |

Primary Examiner—Stephen Marcus
Assistant Examiner—Stephen Cronin
Attorney, Agent, or Firm—John A. Doninger

[57] ABSTRACT

A mixing bowl of generally arcuate configuration and including laterally spaced stabilizing ribs extending along the outer surface thereof between the base and a mouth-defining rim. The ribs, upon an inclination of the bowl, continuously define a laterally extending support plane. The interior of the bowl is of a hard smooth material while the exterior thereof is of a non-slip friction-enhancing material. The open mouth of the bowl is surrounded by an outwardly flaring rim with a grip-enhancing undersurface.

12 Claims, 3 Drawing Sheets

TILTING MIXING BOWL

BACKGROUND OF THE INVENTION

Mixing bowls used in a kitchen environment basically comprise a base for the stable upright positioning of the bowl, a peripheral wall extending arcuately upward and outward relative to the base, and an upper wall rim defining the open top or mouth of the bowl. The bowl, both interiorly and exteriorly, is of a generally hemispherical configuration which facilitates a blending or a mixing of the contents within the bowl and a manual inclining or tilting of the bowl for facilitating the introduction and use of implements, such as beaters or stirrers, for mixing of the contents.

A problem with the conventional mixing bowl, when inclined and held by one hand, and particularly when subjected to a substantial agitation of the contents of the bowl, is the tendency of the bowl to peripherally roll, tip, or otherwise shift in a lateral direction on the support surface, for example a table top. This, as will be appreciated, can result in improperly mixed contents, spilled contents, and like problems.

A further problem with the conventional mixing bowl, terminating in an upper edge with smooth, hard inner and outer surfaces defining the bowl mouth, is the difficulty in manually gripping the bowl wall. The grip afforded thereby is usually less than satisfactory, particularly as the foodstuffs, during mixing, may tend to spill over the narrow upper edge of the bowl and flow along the exterior of the bowl.

Various attempts have been made to expand the versatility of mixing bowls by providing for a tilting or angling of the bowl to a second stable position, note for example the following patents:

| | |
|---|---|
| 1,394,540 | Diack |
| 1,989,574 | Van Roosendael |
| 2,121,165 | Slobodkin |

No provision is made in these patents for the tilting of the bowl at an angle other than the predetermined fixed angle. Any angling of the bowls other than at the fixed angle would result in the same basic instability as experienced in a conventional rounded mixing bowl when tilted.

It is also of interest to note that the patent to Diack refers to the bowl as preferably being of resilient and yielding material, such as rubber.

SUMMARY OF THE INVENTION

It is the intention of the present invention to improve upon several aspects of the conventional mixing bowl, increasing both the utility thereof and the ease of use and manipulation thereof.

Specifically, the mixing bowl of the invention is capable of being inclined or rotated along a continuous path upward and outward of the base between the base and the rim whereby the bowl can, under manual control, assume any of an infinite number of positions along the extent of the path. While this is possible with a conventional rounded or hemispherical bowl, the present invention further provides for a stabilization of the bowl in every adjusted position thereof against lateral tipping, rolling, sliding or the like. This is achieved by providing at least two coplanar support points or surfaces laterally aligned and spaced from each other peripherally of the exterior surface of the bowl and at every adjustably inclined position of the bowl along the predetermined path of inclination.

Further stability is introduced both by the provision of a non-slip exterior surface on the bowl and the provision of means which facilitates a manual gripping of the bowl to effect the tilting or inclining thereof during a mixing operation.

The various objects and advantages of the mixing bowl of the invention result from the formation of the mixing bowl with selected unique features not heretofore suggested in the conventional bowl constructions.

More specifically, the mixing bowl of the invention, having a basically rounded or hemispherical configuration, includes a planar support base and stabilizing means extending continuously upward from the base along and generally following the arcuate curvature of the bowl. The stabilizing means, preferably in the nature of a pair of laterally spaced projecting ribs, defines a support plane, at each inclined position therealong, sufficiently outward of the arcuate surface of the bowl to engage a support surface, for example a table top, with the bowl surface spaced slightly therefrom. The ribs define the path along which a bowl is tilted or inclined, with the spacing between the ribs, at each inclined position thereof along the path, providing lateral coplanar support points or surfaces which resist any tendency of the bowl to roll or rock laterally, particularly during a mixing operation wherein the contents of the bowl can be vigorously stirred. This stability is not limited to any fixed adjusted position, but is effective throughout the full and continuous range of adjustment as defined by the length of the stabilizing means or ribs.

Additional stability is introduced through the formation of the bowl with a non-slip exterior surface, preferably of an appropriate moldable elastomer such as rubber or a rubbery synthetic polymer capable of developing substantial frictional engagement with the table top. Such a surface is provided only about the exterior of the bowl. The interior of the bowl, in order to accommodate a variety of mixing and/or beating implements, both manual and mechanical, is to be of a strong and break-resistant nature, for example high-impact acrylic, or the like, presenting a smooth surface with minimal frictional resistance to the movement of the foodstuffs within the bowl. It is contemplated that the bowl be formed with integrally molded inner and outer shells, joined by fusion bonding or the like to provide a unitary structure incorporating the separate properties desired for both the interior and the exterior of the bowl.

The stability of the bowl, when manually gripped and inclined, is further enhanced by the provision of a flared upper rim which can be conveniently gripped by the hand of the user with the fingers curling thereunder and engaging the undersurface thereof exterior of the bowl. This undersurface also includes the friction-enhancing surface. The top of the flared rim provides a hard, smooth surface consistent with that of the interior surface of the bowl for ease of the pouring of the contents of the bowl. The outward flare itself, extending beyond the bowl, minimizes any tendency for the contents of the bowl, either during a mixing operation or as the contents are poured from the bowl, to run down the exterior surface of the bowl, which in turn could have an adverse affect on the stability of the inclined bowl and the manual gripping thereof.

DESCRIPTION OF PREFERRED EMBODIMENT

Figure 1:
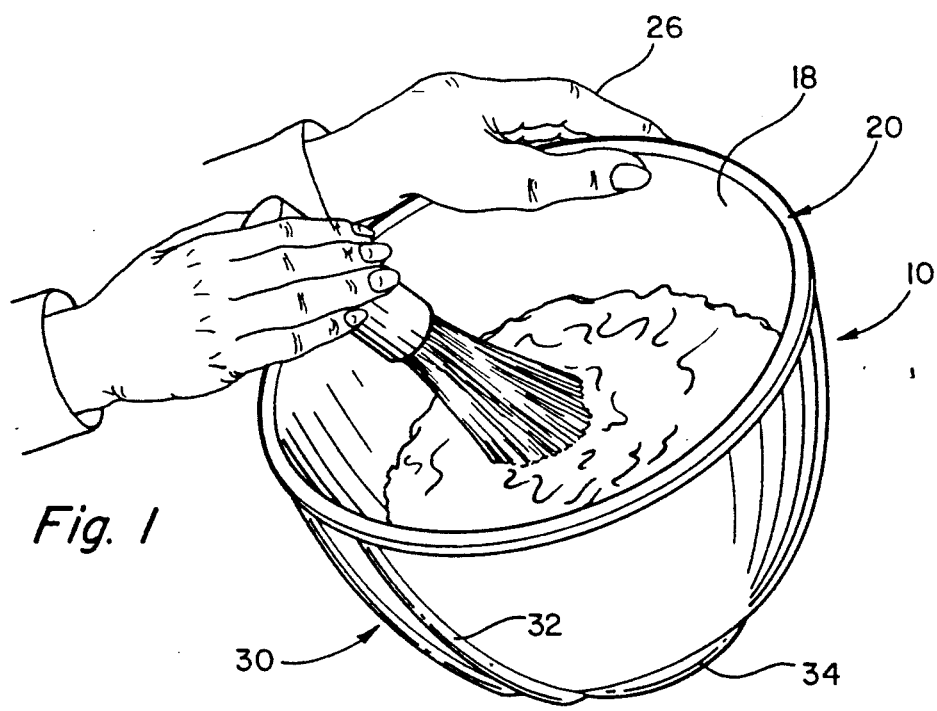
FIG. 1 is a perspective view of the mixing bowl of the invention in use.

Referring now more specifically to the drawings, the mixing bowl 10 includes coextensive inner and outer shells 12 and 14 co-molded and fusion bonded into a unitary structure having a generally hemispherical configuration. The upper portion of the bowl wall 16, defined by the bonded shells 12 and 14, as illustrated, will diverge from a true hemispherical configuration and extend vertically to define a smooth vertical inner wall surface peripherally about the mixing bowl 10 immediately adjacent the upwardly directed open mouth 18 of the bowl 10.

The inner shell 12 is of an appropriate strong and break-resistent material, and presents a smooth inner surface capable of both accommodating the foodstuff without any tendency of the foodstuff sticking or adhering to the surface, and being equally capable of resisting repeated impact thereagainst by the mixing or beating implement. Selected materials for the inner shell may include high-impact acrylic, melamine, and like synthetic resinous materials.

The outer shell 14 is to have a substantially greater coefficient of friction than said inner shell and thus is formed of a friction enhancing non-slip material, for example an elastomer capable of developing a substantial frictional engagement with a smooth support surface, table top or the like. The material, as desired, may comprise natural rubber, a rubbery synthetic polymer, silicone rubber and like materials providing, relative to the hard inner shell, a soft outer shell.

Figure 9:
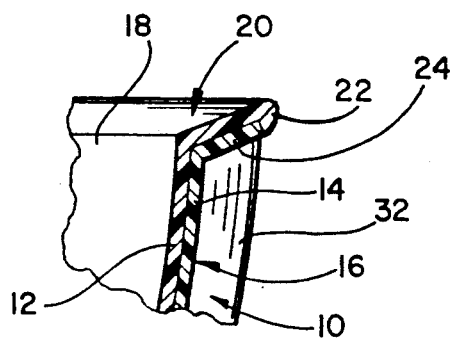
FIG. 9 is a cross sectional detail of the outwardly flared rim of the bowl and the inner and outer shells of the bowl.
Figure 3:
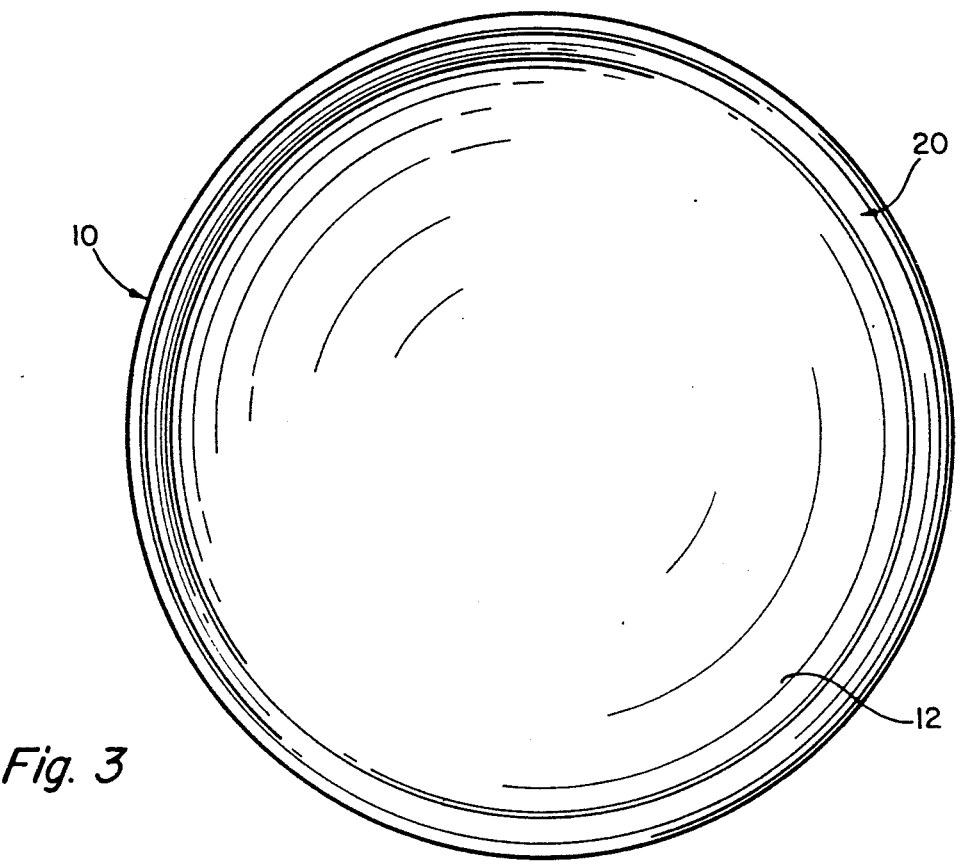
FIG. 3 is a top plan view of the mixing bowl.

Noting the detail of FIG. 9 in particular, the upper portion of the bowl wall 16, peripherally about the bowl mouth 18, is provided with an outwardly and upwardly flaring flange or rim 20 extending from the vertical portion of the wall at an angle approximately 20 degrees to the horizontal or approximately 110 degrees to the exterior of the bowl adjacent the mouth 18. The rim 20 extends outward approximately ¼ to ⅜ inch, and provides a smooth pouring lip sufficiently beyond the outer surface of the bowl to avoid any tendency for the poured contents to run down the outer surface of the bowl. It will be noted that the inner shell 12, in the portion thereof defining the upper surface of the rim 20, includes an outer depending lip edge 22 which defines an underlying recess intimately receiving the rim-forming portion 24 of the outer shell to define a frictional gripping surface. This underlying gripping surface is protected from the bowl contents by the outer lip portion 22 and defines a positive grip means for the fingers of a hand 26 gripping the bowl as suggested in FIG. 1 during a tipping of the bowl and a mixing or stirring of the contents.

Figure 2:
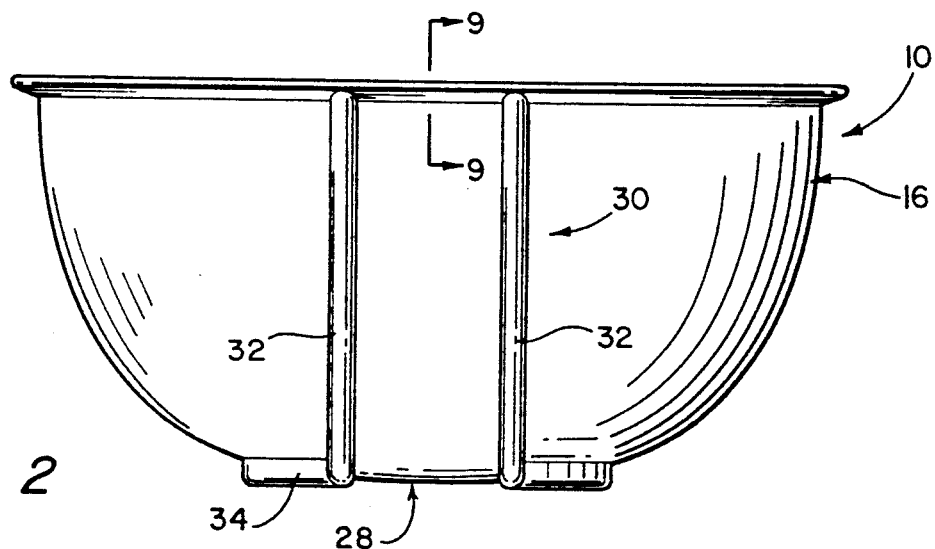
FIG. 2 is a side elevational view of the side of the mixing bowl.
Figure 5:
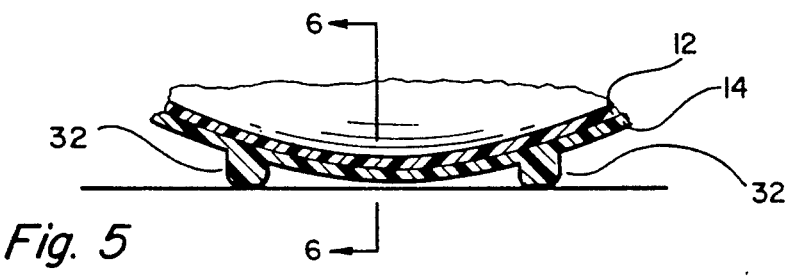
FIG. 5 is an enlarged sectional detail illustrating the tilted bowl supported on the dual stabilizing ribs.
Figure 6:
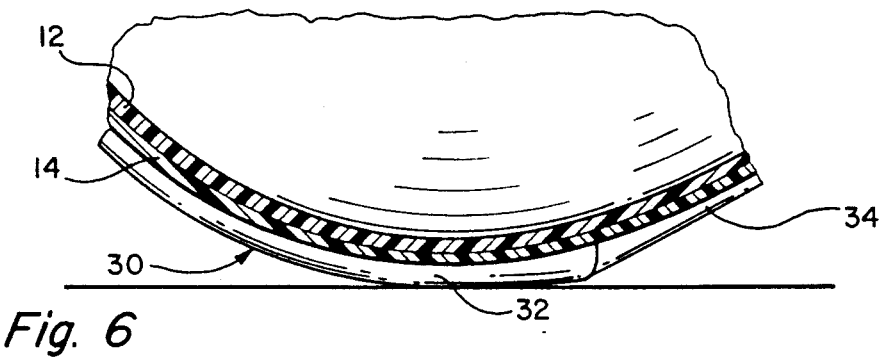
FIG. 6 is a sectional detail taken substantially on a plane passing along line 6—6 in FIG. 5.
Figure 7:
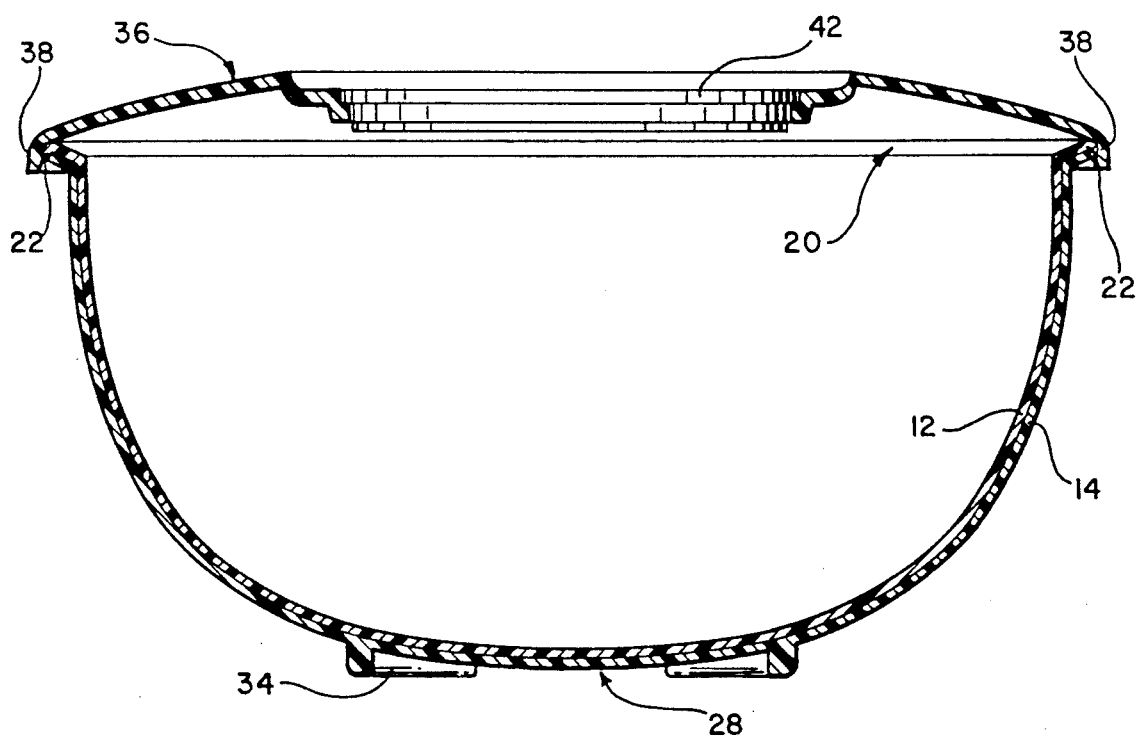
FIG. 7 is a transverse sectional view through the mixing bowl with a seal snap-mounted thereto, the seal having a center mounted secondary seal or plug.

The mixing bowl 10 is to be used either positioned upright on the base portion 28 thereof, as in FIGS. 2 and 7, or at any degree of inclination, as suggested in FIGS. 1, 5 and 6, between the upright base-supported position and at an angle thereto which could approach 90 degrees. The actual angle of inclination is infinitely variable along an arc generally corresponding to the arcuate exterior of the bowl.

The mixing bowl 10 also significantly differs from a conventional mixing bowl by the provision of stabilizing means 30 for defining, at each angular orientation of the bowl, a laterally elongate support plane that, upon engagement with a table top or the like, resists any tendency for a lateral tipping or rolling of the bowl during a mixing operation and notwithstanding a substantial agitation of the bowl contents by the beating or mixing implement.

The stabilizing means 30 is defined, in the preferred embodiment, by a pair of laterally spaced stabilizing ribs 32, each integrally molded with and of the same non-slip material as the outer shell 14.

The ribs are laterally spaced and parallel to each other along arcs on the outer surface of the bowl at equal distances to the opposite sides of an imaginary center plane on a diameter of the bowl. The ribs 32 terminate in opposed ends at the bowl rim 20.

Figure 4:
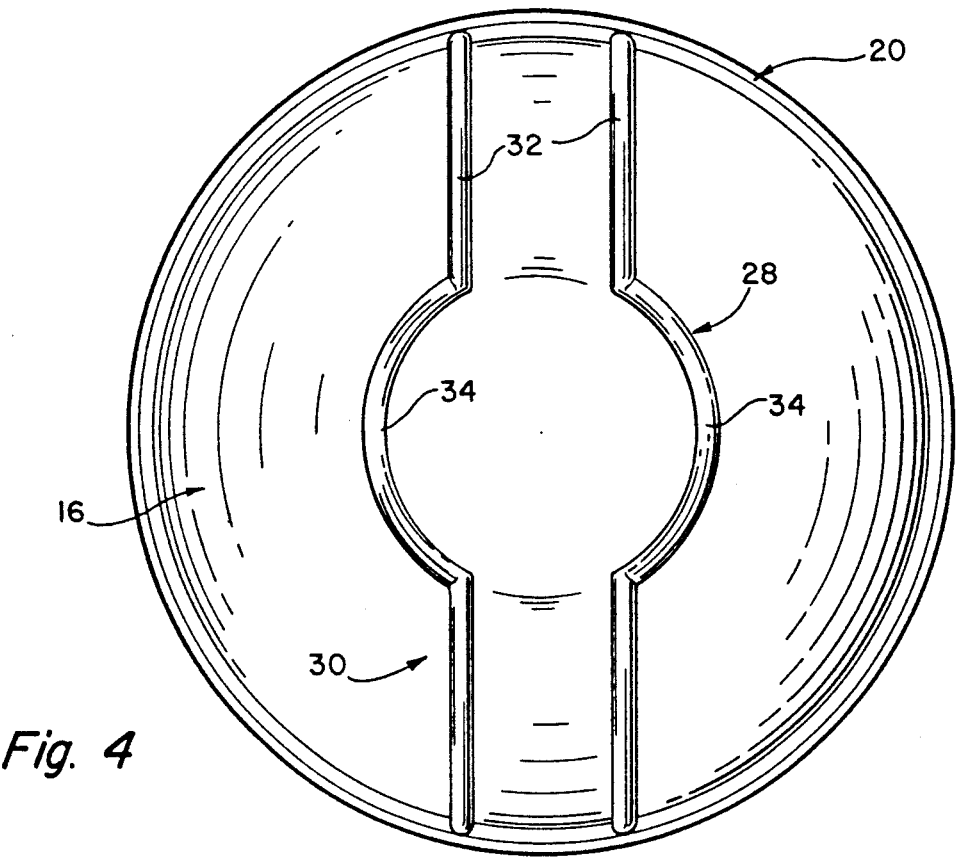
FIG. 4 is a bottom plan view of the mixing bowl.

At the base portion 28 of the bowl 10, the two ribs diverge arcuately outward in opposed directions to define a pair of coplanar base supports 34 which form an interrupted circular bowl base as best seen in FIG. 4.

Noting FIGS. 5, 6 and 7, the lateral spacing of the ribs 32, and the height or outward extent thereof, are such as to, in each inclined position of the bowl, ensure that the curvature of the bowl wall 16, between the stabilizing ribs 32, does not project below the support plane defined by the lower extremities or support faces of the ribs which engage the table top. Preferably, and again as suggested in the drawings, the outer extent of the ribs 32, will actually slightly space the bowl above the support surface or table top, thus providing, in each inclined position away from the base, laterally spaced support points in a common plane whereby a substantial resistance, enhanced by the non-slip nature of the exterior of the bowl, is provided against any tendency of the bowl to slip or roll laterally whether from swirling contents within the bowl resulting from the mixing operation, or the natural tendency of the hand to shift.

In order to further enhance the stability of the inclined bowl, the ribs 32 can have a slightly elliptical lower edge, thereby providing a wider engagement area between the ribs and the table top or the like.

The laterally spaced ribs 32 define a vertically directed arcuate path along which the mixing bowl is to be inclined. The ribs are of a height, that is an extent outward from the outer surface of bowl, no greater than, and preferably less than the width of the bowl rim 20. As desired, and in order to immediately recognize the orientation of the ribs for manipulation of the bowl, the upper surface of the rim 20 may be provided with appropriate indicia indicating the rib ends. Further, while the ribs 32 preferably extend in opposite directions from the central base-defining portions 34, thus allowing for a tilting of the bowl in either of two directions, a single set of ribs may be utilized to only one side of the bowl base.

Figure 8:
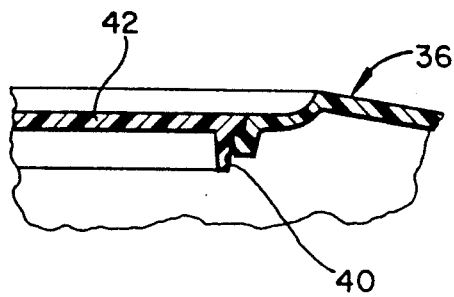
FIG. 8 is a cross sectional detail illustrating the relationship between the removable center plug and the seal.

Noting FIGS. 7 and 8, the bowl 10 is adapted to receive an appropriate snap-on seal or lid 36 which includes a peripheral edge with an appropriate detent configuration 38 which snap engaged about and below the smooth hard outer lip 22 of the rim defined by the hard inner shell 12.

The center of the seal 36 is provided with an enlarged opening 40 adapted to receive a secondary seal or closure plug 42 snap fitted therein. The purpose of the secondary seal is to allow for the selective introduction of a power mixer into a substantially closed mixing bowl whereby splashing or spillage of the bowl contents can be minimized. Preferably this secondary seal will be releasably mounted through a peripheral detent engagement means as suggested in FIG. 8.

While the desired lateral stability of the bowl in any inclined position thereof relative to the upright base-supported position results principally from the provision of the laterally spaced continuous ribs, a significant secondary contribution to stability results from the rubbery non-slip bowl exterior and the substantial frictional engagement achievable between this exterior and the support surface, table top or the like. It is of significance that this non-slip exterior is combined with a smooth hard interior surface which provides minimal frictional resistance or adherence of the foodstuff therewith during the mixing procedure.

A further desirable aspect of the provision of the rubbery outer surface is the cushioning and sound-absorption achieved thereby, providing in effect a "quiet bowl" which tends to minimize, as an example, the sound of the beating or mixing element impacting on the hard interior surface of the bowl, as well as the sound of the bowl itself impacting against the table as it is moved thereon and thereabout.

The foregoing is considered illustrative of the principals of the invention and such variations and modifications as may suggest themselves to those skilled in the art are to be considered within the scope of the invention as defined in the claims.

We claim:

1. A mixing bowl for foodstuffs and the like, comprising a base with a surrounding wall extending upward from said base and terminating in an upper peripheral rim, said rim defining an open mouth for said mixing bowl, said wall including an inner surface defining the interior of the bowl, and an outer surface defining the exterior of the bowl, said outer surface being of a generally convexly arcuate configuration along the height of the bowl between said base and said rim, and peripherally about said bowl, said bowl being manually tiltable on the exterior thereof to any of a plurality of inclined positions to aid in the introduction, removal and manipulation of bowl contents, and stabilizing means extending upwardly from said base along and generally following the arcuate configuration of said outer surface toward said rim for selective engagement of said stabilizing means, at every point therealong, with a support surface upon a tilting of said bowl, said stabilizing means at each position of engagement with the support surface having a lateral extent, in a peripheral direction about said bowl, defining a laterally elongate support plane resisting lateral tipping of said bowl away from said stabilizing means, said stabilizing means comprising laterally spaced parallel ribs affixed to and extending outward from said outer surface, said ribs terminating at said rim, said ribs being provided in two sets of multiple ribs extending upward from said base at opposed portions of said base for a tilting of said bowl in either of two opposed directions on said stabilizing means, said ribs, along the length thereof, having outer edges spaced outward of the outer surface of the bowl sufficient to define said support plane beyond said outer surface between the ribs, and said rib outer edges being of a generally elliptical configuration to define wide bearing areas.

2. A mixing bowl for foodstuffs and the like, comprising a base with a surrounding wall extending upward from said base and terminating in an upper peripheral rim, said rim defining an open mouth for said mixing bowl, said wall including an inner surface defining the interior of the bowl, and an outer surface defining the exterior of the bowl, said outer surface being of a generally convexly arcuate configuration along the height of the bowl between said base and said rim, and peripherally about said bowl, said bowl being manually tiltable on the exterior thereof to any of a plurality of inclined positions to aid in the introduction, removal and manipulation of bowl contents, and stabilizing means extending upwardly from said base along and generally following the arcuate configuration of said outer surface toward said rim for selective engagement of said stabilizing means, at every point therealong, with a support surface upon a tilting of said bowl, said stabilizing means at each position of engagement with the support surface having a lateral extent, in a peripheral direction about said bowl, defining a laterally elongate support plane resisting lateral tipping of said bowl away from said stabilizing means, said stabilizing means comprising laterally spaced parallel ribs affixed to and extending outward from said outer surface, said ribs terminating at said rim, said ribs being provided in two sets of multiple ribs extending upward from said base at opposed portions of said base for a tilting of said bowl in either of two opposed directions on said stabilizing means, said ribs, along the length thereof, having outer edges spaced outward of the outer surface of the bowl sufficient to define said support plane beyond said outer surface between the ribs, each set of ribs including a pair of ribs, the pair of ribs in each set aligning with the corresponding ribs in the other set, said base including a pair of opposed outwardly arced rib extensions between aligned ribs of the two pairs of ribs, said outwardly arced portions defining a generally circular support at said base.

3. A mixing bowl for foodstuffs and the like, comprising a base with a surrounding wall extending upward from said base and terminating in an upper peripheral rim, said rim defining an open mouth for said mixing bowl, said wall including an inner surface defining the interior of the bowl, and an outer surface defining the exterior of the bowl, said outer surface being of a generally convexly arcuate configuration along the height of the bowl between said base and said rim, and peripherally about said bowl, said bowl being manually tiltable on the exterior thereof to any of a plurality of inclined positions to aid in the introduction, removal and manipulation of bowl contents, and stabilizing means extending upwardly from said base along and generally following the arcuate configuration of said outer surface toward said rim for selective engagement of said stabilizing means, at every point therealong, with a support surface upon a tilting of said bowl, said stabilizing means at each position of engagement with the support surface having a lateral extent, in a peripheral direction about said bowl, defining a laterally elongate support plane resisting lateral tipping of said bowl away from said stabilizing means, said inner surface being of a hard smooth material presenting minimal frictional resistance to movement of foodstuffs thereabout, said stabilizing means being of a non-slip material having a greater coefficient of friction than said inner surface for frictional gripping of the support surface.

4. The mixing bowl of claim 3 wherein said stabilizing means comprises laterally spaced parallel ribs affixed to and extending outward of said outer surface and wherein said ribs terminate at said rim.

5. The mixing bowl of claim 4 wherein said ribs are provided in two sets of multiple ribs extending upward from said base at opposed portions of said base for a tilting of said bowl in either of two opposed directions on said stabilizing means.

6. The mixing bowl of claim 5 wherein said ribs, along the length thereof, have outer edges spaced outward of the outer surface of the bowl sufficient to define said support plane beyond said outer surface between the ribs.

7. The mixing bowl of claim 6 wherein said bowl wall is defined by intimately bonded inner and outer shells, said ribs being integrally formed with said outer shell, said outer shell and ribs, in their entireties, being formed of said material of greater coefficient of friction.

8. The mixing bowl of claim 7 wherein said rim extends outwardly of said wall peripherally thereabout and is defined by an overlying outer rim portion of said inner shell and an underlying outer rim portion of said outer shell, said rim portion of said outer shell defining a non-slip gripping surface as the undersurface of said rim, said rim portion of said inner shell defining a smooth pouring surface.

9. The mixing bowl of claim 8 wherein said rim portion of said inner shell terminates in a rigid outer lip extending about the corresponding outer edge of the rim portion of said outer shell and defines a hard outer rim edge for the releasable locking thereto of a snap-on overlying seal.

10. The mixing bowl of claim 3 wherein said stabilizing means comprises laterally spaced parallel ribs affixed to and extending outward from said outer surface.

11. The mixing bowl of claim 10 wherein said rim extends generally laterally outward from said wall peripherally about said wall, said rim including an upper surface comprising a continuation of the inner surface of said bowl, and a lower surface of the same material as said stabilizing means to define an enhanced gripping surface.

12. A mixing bowl for foodstuffs and the like, said bowl including a base and a bowl wall extending upwardly from said base, said bowl wall terminating in an upper rim defining an upwardly opening mouth, said bowl wall having an interior surface and an exterior surface, stabilizing means arcuately defined continuously along said exterior surface between said base and said mouth for engagement with a support surface upon a tilting of said bowl, said stabilizing means presenting laterally aligned coplanar surface portions defining laterally elongate support plane for engagement with the support surface as the bowl is tilted at every angle along said stabilizing means, said stabilizing means comprising a pair of laterally spaced ribs projecting from said exterior surface and including outer edge portions, defining said coplanar surface portions, at every point along the length thereof, said ribs following an arcuate path between said base and said mouth.

* * * * *